Dec. 14, 1971  W. H. LOWERY  3,626,629
WEED-PROOF FISHHOOK
Filed July 20, 1970

INVENTOR.
WILLIAM H. LOWERY
BY Bruns and Jenney
ATTORNEY

United States Patent Office 3,626,629
Patented Dec. 14, 1971

3,626,629
WEED-PROOF FISHHOOK
William H. Lowery, 112 Grove Place,
Utica, N.Y. 13501
Filed July 20, 1970, Ser. No. 56,514
Int. Cl. *A01k 83/00*
U.S. Cl. 43—43.2                                         1 Claim

ABSTRACT OF THE DISCLOSURE

A fishhook having a long shank bent at substantially a right angle to provide a shank portion extending from the other shank portion in a direction opposite to that in which the point extends. There is an eye at the end of the shank and a second eye between the right angle bend of the shank and the curve of the hook so that, when the leader is brought through the end eye and tied to the second eye, the shank is pulled ahead of the point preventing weeds from entering and engaging the hook curve. When a fish is hooked the pull of the line through both eyes is in substantially the direction in which the point is facing because the hook is weighted by the fish.

BACKGROUND OF THE INVENTION

This invention relates generally to fishhooks and more particularly to an improved fishhook which is resistant to snagging when used in waters where there are weeds.

When fishing in weeds, it is well known that weeds become entangled in the curve of the hook when the hook is pulled through the water. Some prior art hooks, to prevent snagging, bend the hook inward with the point toward the shank. This reduces the kinds of fish which can be caught with the hook.

Other prior art anti-snagging hooks provide a resilient guard in front of the point. This is disadvantageous in that the fish is frequently warned away by striking the guard before he takes the hook.

Other prior art hooks provide a bend in the shank of the hook so that the lower portion of the shank precedes the curve of the hook through the weeds. Such hooks have been unsatisfactory because the angle of the shank bend is insufficiently sharp to prevent the point of the hook from snagging in the weeds. If a sharper bend is made, then the line tends to pull the hook out of the fish when he is hooked because the pull of the line is not in the direction in which the point of the hook faces.

SUMMARY OF THE INVENTION

The fishhook of the present invention has a straight hook and a long shank which is bent a full 90 degrees approximately midway between the point and the eye at the end of the shank. The shank portion adjacent the eye extends from the other shank portion in a direction opposite to that in which the point extends from the shank, the pointed end of the fishhook and the shank thereof lying substantially in the same plane. A second eye or loop, to which the line, or leader portion thereof, is adapted to be tied, is provided fixed to the shank at a point thereon so that a straight line through the two eyes extended passes substantially through the tip of the fishhook point.

The leader is first passed through the eye at the end of the shank and then tied to the second eye so that, when the lightly-baited hook is pulled through the water, the shank precedes the point, extending about an equal amount on either side thereof. There are then portions of the shank inclined to the direction of the pull of the line in one direction or the other, preceding and on either side of the point which brush the weeds aside to prevent their becoming entangled with the point end of the hook. When a fish takes the hook, however, it is weighted and the pull of the line is substantially in the same direction as that in which the pointed end faces.

DESCRIPTION OF THE PREFERRED EMBODIMENT

Figure 1:
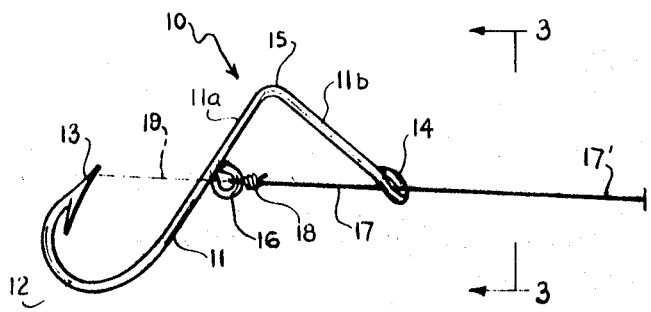
FIG. 1 is a side elevational view of a fishhook according to the invention, a leader being shown attached thereto and extending in a direction in which the baited hook is pulled through the water.

Referring to FIG. 1, a fishhook 10 has a shank 11, curved at 12 and terminating at one end in a barbed point 13, and at the other end in the usual eye 14.

The shank 11 is bent at substantially a right angle at 15, a portion 11a of the shank extending from the bend 15 to the curve 12 and the other portion 11b of the shank extending from the bend 15 to the terminal eye 14. A second eye 16 is secured to the shank portion 11a, as by brazing, at a point on the shank approximately midway between the bend 15 and the curve 12.

A leader 17 is shown passing through eye 14 and attached at 18 to the second eye 16, the second eye being secured on the shank portion 11a so that a line extended from eye 14 through eye 16, as indiciated by the broken line 19, passes substantially through the tip of the point 13 of the hook.

The portion 17' of the leader, which extends from the fishhook 10 to the fishline, represents the direction in which the fishhook is normally pulled through the water. It will be noted that the portion 11b of the shank precedes the tip of the point 13 of the hook on one side of the line of the leader while that portion of the shank 11a adjacent curve 12 and the curved portion 12 itself precedes the tip of the point 13 of the hook on the other side, extending about equally on either side of the leader.

Figure 3:
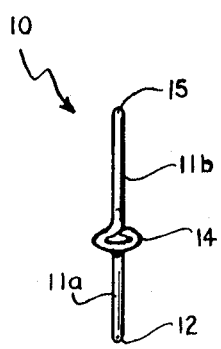
FIG. 3 is an end view of the hook of FIG. 1 as viewed in the direction of the arrows 3—3 of FIG. 1.

Referring now to FIG. 3, a view substantially along the line of the leader 17, it will be apparent that the point of the hook 13 is guarded on either side against weeds snagging in the hook.

Figure 2:
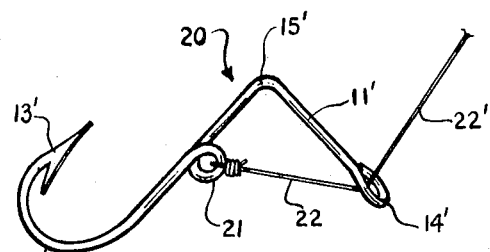
FIG. 2 is a view similar to FIG. 1 of a modified form of fishhook, a leader being shown attached thereto and extending in a direction in which the hook is pulled when a fish has taken the hook.

Referring now to FIG. 2, a modified fishhook 20 is shown, with shank 11' bent at 15' just as the fishhook 10. The fishhook 20 differs only in that the second eye 21 is formed by a loop of the shank 11' itself instead of being attached. The second eye 21 is aligned substantially between the terminal eye 14' and the tip of the point 13'.

A leader 22 tied to the eye 21 extends through eye 14' and then a further portion 22' of the leader extends generally in the direction in which the point 13' is facing. When a fish has taken either the hook 10 or hook 20, its comparatively large weight makes the length of the lever arm between the bend and terminal eye substantially negligible and the direction of the pull of the line, represented by the portion 22' in FIG. 2, is substantially in the direction in which the point faces.

I claim:

1. A fishhook having a sharp tipped point at one end and a terminal eye at the other, the point being connected to the eye by a substantially semicircular curved portion connected to the point and merging into a shank terminating in the eye, the shank being at least twice as long as the hook between its point and the curved portion and being bent substantially 90 degrees between the terminal eye and the curved portion, the shank having a second eye fixed thereto substantially aligned between the tip of the point and the terminal eye, the bent terminal end of the shank extending from the shank in a direction opposite to that in which the point extends from the shank and lying substantially in the same plane, whereby the hook is normally pulled through the water with the shank in advance of the point by a line passing through the terminal eye and secured to the second eye, and is pulled in a direction substantially that in which the point faces when a fish has taken the hook.

References Cited
UNITED STATES PATENTS

| | | | |
|---|---|---|---|
| 3,023,536 | 3/1962 | Williams | 43—43.2 |
| 3,130,514 | 4/1964 | Cornick | 43—43.16 X |

SAMUEL KOREN, Primary Examiner

D. J. LEACH, Assistant Examiner